United States Patent Office 2,765,652
Patented Oct. 9, 1956

2,765,652

FLAW DETECTION

William C. Levengood, Toledo, Ohio, assignor to Libbey-Owens-Ford Glass Company, Toledo, Ohio, a corporation of Ohio No Drawing. Application March 26, 1954,
Serial No. 419,094

5 Claims. (Cl. 73—104)

This invention relates to the detection of flaws in solid bodies and more particularly to the detection of submicroscopic flaws found in such bodies which cannot be found by ordinary detection techniques.

It has been well known that surface scratches on solid bodies have a very decided adverse effect on the strength of such bodies, however, in many cases even though the scratches have been known to be present, there have been no known production methods for detecting these scratches of submicroscopic characteristics. Nevertheless, their existence has been proven by mathematical formulae and by strength tests made on various bodies by A. A. Griffith and noted in his treatise on "The phenomena of rupture and flow in solids," Transactions of the Royal Society (London) A221, 163–98, published in 1920. In this work, even though the scratches on the bodies tested were not susceptible to detection by conventional methods or by microscopic techniques, it is shown that scratches were present on the surface of such bodies and increased the maximum stresses and strains therein from two to six times according to their shape and nature of the stresses.

These scratches or Griffith cracks, as they are sometimes called, are believed to be caused by thermal stresses and/or mechanically induced stresses and have been found to be too fine or small for detection by microscopic or other flaw detection methods such as the Magnaflux and Statiflux methods, although, they have been visually shown to exist on smooth glass objects by means of an experimental vacuum chamber technique developed by E. N. da C. Andrade and L. C. Tsien and described in their article on "Surface cracks in glasses," Proceedings of the Royal Society (London) A159, 346–55, published in 1937. Additional visual verification for the existence of such fracture patterns has also been shown by Levengood and Butler using glue testing methods described in Journal of the American Ceramic Society 36 (8) 257–262 (1953).

In this connection, it is pointed out that both of these experimental techniques show the presence of networks of fractures on the surface of the glass, however, in every case the methods are extremely long and involved and do not lend themselves readily to production techniques where speed and simplicity are very desirable in determining the causes of glass breakage which many times appears to have no apparent cause.

It is therefore a primary object of this invention to provide a novel method of detecting submicroscopic or Griffith cracks in solid bodies.

Another object of the invention is to provide a detecting material or agent that is capable of bringing out submicroscopic cracks or flaws so that they may be readily seen by the naked eye.

A further object of the invention is to provide a method and detecting agent for rapidly and conveniently determining weak areas in glass articles as well as a means whereby the causes of breakage of such articles may be reconstructed.

In the general practice of this invention, which is particularly useful in the glass industry, it has been found that if a smooth polished article is coated with a very thin layer of a specific silvering solution, that the minute fracture patterns or Griffith cracks which are not normally detectable by microscopic techniques or by commercial flaw detection means will be made visible to the naked eye. While the basic components of this silvering solution are not unique in themselves, it is to be pointed out that the invention finds its basis in the proportions used and the method of applying the solution formed therefrom to glass surfaces to study fracture patterns heretofore not detectable by conventional methods.

With more particularity, the silvering solution includes a stock solution A which is formed by dissolving approximately 26 grams of silver nitrate ($AgNO_3$) per liter of water thus giving approximately a 0.15 molar solution, and a second stock solution B which is formed by dissolving approximately 26 grams of potassium hydroxide ($KOH$) per liter of water giving approximately a 0.47 molar solution. A desired amount of solution A is then ammoniated by adding $NH_4OH$ drop by drop until the solution is clear, after which, solution B is added and mixed therewith within the range of ratios of from 1 part of KOH and 1 part $AgNO_3$ to 1 part of KOH and 3 parts of $AgNO_3$, with the preferred ratio being 1 part KOH and 2 parts $AgNO_3$. The resulting solution formed by mixing the two solutions A and B together is then ammoniated by adding $NH_4OH$ to the solutions until the mixed solution is perfectly clear. While the silvering solution thus formed contains elements which are commonly used in silvering processes, it will be noted that the ratio of KOH to $AgNO_3$ used is considerably less than that used in commercial silvering processes in which the ratio of KOH to $AgNO_3$ is greater than 1 to 1.

The smooth polished body upon which the fracture or flaw patterns are to be determined is then cleaned by rubbing the surface lightly with a piece of absorbent cotton which has been dipped in a paste of very fine calcium carbonate and water or other type of non-scratching cleansing agent until the entire surface is covered with a thin layer of the cleansing agent. After cleansing, the body is immediately rinsed first with tap water and then with distilled water until the cleansing agent has been completely removed thus making the polished body ready for silvering.

In the silvering operation, for most effective results, about 30 parts of the silvering solution are added to one part of a reducing solution which is made up by dissolving 170 grams of anhydrous dextrose per liter of water; however, the results of the invention are obtained by using a ratio of silvering solution to reducing agent in the range of from 10/1 to 50/1. This mixture of silvering solution and reducing solution is mixed thoroughly and an extremely thin coating of the solution is immediately poured upon the body to be examined and allowed to set for approximately 45 seconds after which time the fracture patterns will be observed to be sharply outlined. The fracture patterns thus obtained show that the fracture lines are not coated by the silvering solution while the remaining area of the body has an extremely thin silver coating thereon. In this connection, the amount of reducer is kept very low to slow down the silvering process as a fast reaction will cause the silver layer to build up too rapidly and coat the fracture areas rather than leaving them exposed.

After the coating has set, should it be desired to save the fracture pattern obtained for further reference, the excess silvering solution may be rinsed off with water and the body then coated with a fixer such as a transparent plastic or shellac.

With regard to the thickness of the detecting coating, it is to be pointed out that it is imperative that the coating be very thin and substantially transparent, generally of not more than 400 Angstrom units in thickness since a heavy coating will completely cover the minute cracks and fractures which are believed to be less than 1000 Angstrom units in width. This is in contrast to a thickness of approximately 1800 Angstrom units for the opaque coatings of conventional silver mirrors.

While the actual theoretical basis for the invention is not understood, it is believed that the silver atoms or molecules are kept from filling or covering the cracks by an electrostatic charge set up between the sides of the cracks because of their close proximity to each other which charge thus causes repulsion of the silver atoms or molecules on the surface of the body adjacent the fracture area. This phenomenon may be explained by the fact that all atoms and molecules have electrostatic charges, which charges when opposite tend to attract each other, and when alike tend to repel each other, the force being indirectly proportional to the square of the distance between the atoms or molecules. Another possible explanation of the invention may be attributed to Benard cells which are formed through a thermal phenomenon. The formation of these cells may be disrupted by the presence of fractures causing electrostatic fields as described above.

Although the components of the detecting agent listed above are preferable for the purposes of the invention, other similar solutions of the same general family may be used. For example sodium hydroxide may be used in place of the potassium hydroxide in solution B, and other reducing agents such as formaldehyde, glucose, levulose, etc., might be used instead of the anhydrous dextrose. However, in using any of the compositions to form the silvering solution, it is important that the temperature of the room be very closely controlled and kept under close surveillance since temperature has a very direct bearing upon the reaction of the silvering solution. Also, localized temperature gradients on the body itself may affect the patterns formed and should therefore be kept at a minimum.

While the invention is not limited to any specific application, the method is particularly applicable to the glass industry where it aids in reconstructing the causes of breakage, or helps to alleviate other faulty conditions some of which will be apparent from the following examples:

Example 1

A detailed study was made of the characteristics of the finish on plate glass. Four samples 2″ x 2″ were first graded by conventional methods such as edge lighting etc., and then were examined by a microscope and found to have no visible fracture patterns. Each of the samples was then coated with the detecting agent described herein and the fracture pattern on each of the samples was made clearly visible to the naked eye. In analyzing these patterns, it was found that as the finish became poorer, the fracture patterns became much finer and more numerous. The crack patterns thus shown by the detecting agent were found to have been caused by rouge pits which were formed by the rouge material normally used in the polishing of the glass. These cracks, which were found to run from rouge pit to rouge pit, indicated that the rouge pits and other defects remaining after the grinding and polishing process acted as origins for the numerous cracks and fractures shown up by the detecting agent in these particular specimens.

Example 2

Five samples 2″ x 4″ were cut from each of two sheets of glass which were tempered to different degrees and contained various degrees of strains therein. The samples were first analyzed by conventional microscopic techniques and were found to exhibit no fracture patterns. The detection method described hereinabove was then used on each of the samples and brought forth very definite fracture patterns and indicated that the fractures and their fineness increased as the strain in the glass increased.

Example 3

The detecting agent and method described herein were used to observe fracture growth during the fatiguing of glass. Three glass strips approximately 2″ x 6″ were supported on their ends and a 12 pound load was applied at the center of each of the strips at the rate of approximately 100 cycles per minute for varying lengths of time so as to cause a marked bending of the strip after which, the detecting agent was applied to the strips.

Using this loading method, strip 1 was flexed 100 cycles and visually showed the fractures as they progressed a very short distance inwardly toward the center of the strip from the edge portions thereof. Strip 2 was flexed 200 cycles in the same manner and the fractures were noted to increase in length towards the center of the strip. Strip 3 was flexed 300 cycles and the fracture lines were observed to cross each other and to increase in length towards the inner areas of the strip. It is believed that this is a first time that the fatiguing of a glass body was observed short of a complete fracture or breaking of the glass.

It will be apparent that while several examples have been given setting forth various uses of the invention, the invention also lends itself to other important applications such as in police and crime investigation work. Criminology laboratories are constantly confronted with glass articles, broken or otherwise, and are asked in many cases to determine the causes of breakage, the general shapes of objects used to break the glass, or what treatment the glass object has been subjected to.

In this regard, in the determination of the causes of breakage, the fracture patterns or Griffith cracks found in the body being examined may be compared to artificially produced fracture patterns to give a basis for the breakage. According to this procedure, the various fracture patterns are compared to fracture patterns that have been produced in a sample object by artificial methods such as pointed or blunt objects etc., to give an indication of what treatment the object being examined has undergone and what objects might have been used to inflict the damage.

Similarly as before mentioned, the invention also lends itself to production or manufacturing uses where it may be used to detect the causes of breakage of such articles as sheet glass, bottles and jars, and other similar products as they move through the various forming operations of the production process.

I claim:

1. The method of detecting submicroscopic cracks in a smooth body, including the steps of cleaning a surface of the body with a nonscratching cleansing agent, rinsing the cleansing agent from the surface, and applying a coating of not substantially more than 400 Angstrom units thickness of a silver solution to the surface of the body to render the submicroscopic cracks visible to the eye.

2. The method of detecting submicroscopic cracks in a smooth surface, including the steps of cleaning the surface with a non-scratching cleansing agent, rinsing the cleansing agent from the surface, and applying a coating of not substantially more than 400 Angstrom units thickness of a silver solution including $AgNO_3$ and $KOH$ and a reducing agent to the surface to render the submicroscopic cracks visible to the eye.

3. A method of detecting submicroscopic cracks in a surface, comprising cleaning the surface with a non-scratching cleansing agent, rinsing the cleansing agent from the surface, and applying a thin coating of a silver solution to the surface in a thickness which will leave the submicroscopic cracks uncoated with the silver solution while leaving a coating of said solution on the areas adjacent said cracks to outline such cracks and render them visible.

4. A method of detecting submicroscopic cracks in a body as claimed in claim 3, in which the cleansing agent is calcium carbonate.

5. A method of detecting submicroscopic cracks in a surface as claimed in claim 3, in which the silver solution comprises an ammoniated silvering solution of $AgNO_3$ and KOH and a reducing agent of dextrose and water.

References Cited in the file of this patent

UNITED STATES PATENTS

| | | |
|---|---|---|
| 2,273,613 | Bartoe | Feb. 17, 1942 |
| 2,294,897 | Ellis | Sept. 8, 1942 |
| 2,315,141 | Tryon | Mar. 30, 1943 |
| 2,340,940 | De Forest | Feb. 8, 1944 |
| 2,355,933 | Weiss | Aug. 15, 1944 |